United States Patent
Streppel

(10) Patent No.: US 10,480,725 B2
(45) Date of Patent: Nov. 19, 2019

(54) LIGHT FIXTURE AND LENS FOR A LIGHT FIXTURE

(71) Applicant: LEDVANCE GmbH, Garching bei München (DE)

(72) Inventor: Henrike Streppel, Regensburg (DE)

(73) Assignee: LEDVANCE GMBH, Garching Bei München (DE)

( * ) Notice: Subject to any disclaimer, the term of this patent is extended or adjusted under 35 U.S.C. 154(b) by 0 days.

(21) Appl. No.: 16/045,971

(22) Filed: Jul. 26, 2018

(65) Prior Publication Data

US 2019/0032865 A1 Jan. 31, 2019

(30) Foreign Application Priority Data

Jul. 26, 2017 (DE) .................. 10 2017 116 885

(51) Int. Cl.
| | |
|---|---|
| *F21K 9/65* | (2016.01) |
| *F21K 9/237* | (2016.01) |
| *F21V 5/04* | (2006.01) |
| *G02B 19/00* | (2006.01) |
| *F21Y 115/10* | (2016.01) |
| *F21K 9/69* | (2016.01) |

(52) U.S. Cl.
CPC ............... *F21K 9/65* (2016.08); *F21K 9/237* (2016.08); *F21V 5/045* (2013.01); *G02B 19/00* (2013.01); *F21K 9/69* (2016.08); *F21Y 2115/10* (2016.08)

(58) Field of Classification Search
CPC . F21V 5/04; F21V 5/045; F21K 9/237; F21K 9/69; F21Y 2115/10
See application file for complete search history.

(56) References Cited

U.S. PATENT DOCUMENTS

| 7,181,378 | B2* | 2/2007 | Benitez | G02B 3/02 359/718 |
| 7,580,192 | B1* | 8/2009 | Chu | F21V 5/04 359/641 |
| 8,016,451 | B2* | 9/2011 | Householder | F21L 4/027 362/188 |
| 8,696,173 | B2* | 4/2014 | Urtiga | F21V 5/045 362/276 |
| 2005/0185300 | A1* | 8/2005 | Kittelmann | F21V 3/04 359/742 |
| 2013/0077320 | A1* | 3/2013 | Duan | F21V 5/045 362/297 |
| 2015/0192257 | A1* | 7/2015 | Javadian | F21V 7/06 362/555 |
| 2016/0312977 | A1* | 10/2016 | Jiang | F21V 5/045 |

* cited by examiner

*Primary Examiner* — Peggy A Neils
(74) *Attorney, Agent, or Firm* — Hayes Soloway PC

(57) ABSTRACT

A light fixture has a housing having a depression in which at least one light-emitting diode is received. The light-emitting diode is mounted on a mounting surface and in operation of the light fixture emits light with an initial emission angle of more than 80°. A lens is arranged downstream of the light-emitting diode, having a central focus area and an outer area radially surrounding the focus area. The central focus area is configured and/or arranged in such a way that a part of the light propagating through the focus area is focused in such a way that a final emission angle of the light propagated through the focus area is at least 50° and at most 80°. The outer area of the lens is spaced at least 2 mm from the mounting surface in a vertical direction.

14 Claims, 5 Drawing Sheets

LIGHT FIXTURE AND LENS FOR A LIGHT FIXTURE

CROSS-REFERENCE TO RELATED APPLICATIONS AND PRIORITY

This patent application claims priority from German Patent Application No. 102017116885.0 filed Jul. 26, 2017, which is herein incorporated by reference in its entirety.

TECHNICAL FIELD

The present invention relates to a light fixture as well as a lens for a light fixture.

TECHNICAL BACKGROUND

Because of their high energy efficiency, light fixtures with light-emitting diodes as light source (so-called LED retrofit lamps) are growing in popularity as a replacement for conventional light fixtures such as halogen or incandescent lamps. In contrast to conventional light fixtures, however, the light generated by light-emitting diodes usually does not cover the entire solid angle homogeneously. However, the generated radiation profile can be adapted by suitable optical units. As a result, in particular, LED spot lights can be provided which emit at a defined and in particular relatively narrow emission angle.

Currently available LED spot lights typically have an emission angle in the region of below 40°. This enables efficient illumination of individual regions in the room, but illumination of a complete room with such low emission angles can only be achieved with difficulty. Moreover, LED spot lights exist which have relatively large emission angles of 100° or 120°. Such LED spot lights with a large emission angle have the advantage that complete rooms can be illuminated by them. However, only relatively little light is emitted downwards, where the light is most required for illumination.

A good compromise between a large surface area illumination and a local illumination can be achieved with an emission angle in the range of at least 50° and at most 80°, in particular at least 55° and at most 70°. However, already existing optical units, with which such an emission angle can be produced, have a low optical efficiency. The optical efficiency is the ratio of the light of the light fixture emitted in a 90° cone according to the EU Directive No. 1194/2012 of Dec. 12, 2012 and the entire light emitted by the light fixture. However, in the design of an optical unit, the spatial dimensions for improvement of the optical efficiency cannot be selected arbitrarily. Advantageously, the optical unit is configured so that it can be introduced into an existing socket, so that compatibility with existing lights is guaranteed.

SUMMARY OF THE INVENTION

Starting from the background described above, it is an object of the present invention to provide a light fixture with an emission angle in the range from 50° to 80° and an improved optical efficiency. A further object of the invention is to provide a lens for such a light fixture.

These objects are achieved by a light fixture and a lens with the features of the independent claims. Advantageous further embodiments are apparent from the subordinate claims, the description, the drawings and also the exemplary embodiments described in connection with the drawings.

Accordingly a light fixture is specified, comprising a housing with a depression in which at least one light-emitting diode mounted on a mounting surface is received. In operation of the light fixture the light-emitting diode emits light with an initial emission angle of more than 80°. Furthermore, the light fixture comprises a lens arranged downstream of the light-emitting diode, having a central focus area and an outer area radially surrounding the focus area. The focus area is configured and/or arranged in such a way that a part of the light propagating through the focus area is focused in such a way that a final emission angle of the light propagated through the focus area is at least 50° and at most 80°, preferably at least 55° and at most 70°. The outer area of the lens is spaced at least 2 mm from the mounting surface in a vertical direction.

The invention is based, in particular, on the idea of providing an already existing housing for a light fixture with a lens which reduces the emission angle of the light-emitting diode to a value of at least 50° and at most 80°. The lens is preferably configured as a convergent lens. The dimensions of the lens can be adapted to the dimensions of the housing, in particular of the depression thereof. Mounting components and/or protrusions for example, which project out of the mounting surface of the light-emitting diode in the vertical direction, in particular at least 1 mm, can be received in the depression of the housing. Preferably such components projecting out of the mounting surface should not come into contact with the lens in order to avoid damage to the lens. On the other hand, the lens should have the least possible spacing from the light-emitting diode in order to limit light losses.

The lens has the focus area and the outer area for the adaptation of the dimensions of the lens to the dimensions of the housing. The focus area serves, in particular, for the reduction of the emission angle, while the outer area enables an adaptation to the dimensions of the housing. The focus area has, in particular, refractive and reflecting characteristics. The outer area is arranged spaced apart from the mounting surface in the vertical direction. The spacing of the outer area from the mounting surface in the vertical direction is at least 2 mm, preferably at least 2.5 mm and particularly preferably at least 3 mm. The spacing of the outer area from the mounting surface in the vertical direction can also be at least 10 mm, preferably at most 8 mm and particularly preferably at most 5 mm. In particular, the focus area in the vertical direction has a spacing of at most 3 mm, preferably at most 2 mm and particularly preferably at most 1.5 mm, from the mounting surface and/or a light-transmissive surface of the light-emitting diode. Due to the division into a focus area and an outer area the light fixture can have an optical efficiency of at least 80%, in particular at least 90%.

The light fixture can have one single light-emitting diode or a plurality thereof. Each light-emitting diode preferably has a light-emitting diode chip, which may be an inorganic and/or an organic optoelectronic semiconductor chip with a light-emitting active zone. In operation of the light fixture the light-emitting diode emits visible light, in particular white light. Each light-emitting diode can have a conversion element which is configured for wavelength conversion of a blue light emitted by the light-emitting diode chip of the light-emitting diode into low-frequency light. The mounting surface of the light-emitting diode can be, for example, a top surface of a printed circuit board or a circuit board.

In this connection and in what follows the term "arranged downstream" should be interpreted in the sense of "arranged downstream in the main emission direction of the light-emitting diode." The main emission direction preferably extends along and/or parallel to a vertical direction of the light fixture. In particular, the main emission direction extends along and/or parallel to an optical axis of the lens. In the following description, directional terms such as for example "above" and "below" always relate to the course of the main emission direction of the light-emitting diode. Thus, the positive direction of the vertical direction extends in the main emission direction.

The lateral directions of the light fixture extend perpendicularly relative to the vertical direction. The lateral directions span a plane which extends, in particular, parallel to a main extension plane of the mounting surface. The magnitude of the lateral direction corresponds to a radial direction of the light fixture. Therefore, the arrangement according to which a first object "radially surrounds" a second object should be understood in this application, in particular, in such a way that the first object is arranged in lateral directions around the second object and/or the first object surrounds the second object, in particular completely, in the lateral directions.

An outer surface of the focus area is preferably at least partially curved in order to enable a change in the propagation direction of the light propagating in the focus area. The curvature may be continuous or, preferably, provided by discrete sections of the outer surface which are positioned adjacent to one another and are in each case planar. The focus area preferably has a convex lens area at least at some points. The outer area is preferably not curved. In particular, an outer surface of the outer area is planar at some points. For example, the outer area is a transparent plate. Alternatively, the outer area can have a curvature which extends in opposite directions to a curvature of the focus area and/or of a central lens area of the focus area.

The focus area preferably has a vertical spacing of at most 3 mm, in particular at most 2 mm, from the light-transmissive surface of the light-emitting diode. The vertical spacing relates to the vertical spacing of a light entry surface of the focus area from the light-transmissive surface. The light emitted by the light-emitting diode in operation can impinge, at least partially, on the light entry surface of the lens, in particular the focus area, and can propagate inside the lens. An emission angle of the light is reduced due to the refraction of the propagating light on the light entry surface and on a light exit surface of the lens arranged downstream of the light entry surface.

In this case and in the following the term "light" always means a light beam. An emission angle (also: opening angle) of a light is the angle between two rays arranged on opposite sides of a light beam which in each case have a light intensity of 50% of a maximum light intensity of a central ray of the light beam.

The light emitted by the light-emitting diode in operation has an emission angle of over 80°, preferably over 100° and at most 140°. In particular, the light-emitting diode can have a Lambertian emission characteristic with an opening angle of 120°.

According to at least one embodiment, the light fixture comprises at least one mounting component, in particular precisely one or precisely two mounting components, which is/are received in the depression and projects beyond the mounting surface in the vertical direction. A total radius of the focus area is at most as great as a lateral spacing between the light-emitting diode and the mounting component. Furthermore, a vertical spacing between the mounting surface and the outer area in the region of the mounting component is at least as great as a height of the mounting component in relation to the mounting surface. The height of the mounting component in relation to the mounting surface is the extent of the mounting component in the vertical direction, starting from the mounting surface. For example, the height of the mounting component in relation to the mounting surface is at least 2 mm, in particular at least 2.5 mm and/or at least 3 mm.

This mounting component can be for example a connecting component, in particular a connecting piece, for a driver. The driver can be mounted, for example, on a side of the mounting surface facing away from the light-emitting diode and can be mechanically connected to the mounting surface, in particular a printed circuit board having the mounting surface, by means of the mounting component.

The total radius of the focus area is half of the maximum lateral extent of the focus area. The total radius of the focus area is, in particular, the lateral spacing between a center point of the focus area and the edge thereof.

For example, in the lateral directions the focus area has, at least partially, a circular symmetry and/or an elliptical symmetry. In other words, in a plan view of the focus area from the vertical direction this area can be at least partially circular and/or elliptical. For example, the maximum lateral extent of the focus area is at most 13 mm, preferably at most 12 mm and particularly preferably 10 mm.

The lateral spacing between the light-emitting diode and the mounting component should be determined from a center point of the light-emitting diode to an inner edge of the mounting component facing the light-emitting diode. The focus area is preferably arranged centered with respect to the center point of the light-emitting diode. The optical axis of the lens preferably extends through the center point of the light-emitting diode.

According to at least one embodiment of the light fixture, the lens closes the depression in the housing with a precise fit. This means that the shape of the lens is adapted to the shape of the depression. In particular, a diameter of the lens corresponds to the diameter of the depression. The diameter of the lens is the maximum lateral extent thereof. The internal diameter of the depression is the maximum lateral extent of the depression as far as an edge bounding the depression.

According to at least one embodiment of the light fixture, the outer area encloses an angle of less than 90° with an optical axis of the lens. For example, the outer area is a light-permeable plate and/or disc, in particular with parallel surfaces. The disc can be bent away from the light-emitting diode, that is to say upwards. In this case and in the following "not curved" can mean that the outer area does not change the emission angle of the light emitted by the light-emitting diode or only changes it insignificantly by a maximum of 5°, in particular by a maximum of 2°. However, a beam displacement can occur.

According to at least one embodiment of the light fixture, the focus area extends in the vertical direction, at most as far as an outer plane defined by an upper outer edge of the outer area. The outer plane is an imaginary, that is to say virtual, plane. In other words, the focus area does not project beyond the outer area. The upper outer plane is, in particular, the part of an outer face which laterally closes off the outer area and has the greatest spacing from the light-emitting diode in the vertical direction.

According to at least one embodiment of the light fixture, the lens projects beyond the housing in a vertical direction at least partially and/or closes off the housing flush with an upper edge of the lens. In other words, the lens does not project beyond the housing. The upper edge of the lens is the region, in particular the point, of the lens which has the greatest spacing relative to the light-emitting diode.

In particular, it is possible that the housing extends in the vertical direction as far as the outer plane defined by the upper outer edge of the outer area. In particular, the housing, the focus area and the outer area can end on a common outer plane.

According to at least one embodiment of the light fixture the lens, in particular the focus area of the lens, is designed in the manner of a Fresnel lens, in particular as a Fresnel convergent lens, and/or the focus area has a central lens area and annular Fresnel steps radially surrounding the central lens area. The Fresnel steps can surround the central lens area concentrically. In each Fresnel step, starting from the central lens area, a thickness of the lens can be reduced in the vertical direction, wherein the light exit surface of the lens in the region of the Fresnel step preferably has the curvature of a regular, in particular convex lens. The central lens area can, for example, be in the form of an in particular spherical optical lens. In particular, the central lens area is in the form of a planar-convex lens.

According to at least one embodiment of the light fixture the lens, in particular, the focus area of the lens has precisely two annular Fresnel steps. In this case the lens, in particular the focus area thereof, preferably has one single central lens area. The higher the number of Fresnel steps the thicker the lens and, in particular, the focus area thereof can be reduced. Conversely the efficiency of the lens decreases as the number of Fresnel steps increases. Particularly, this is because the Fresnel steps do not have an ideal pointed shape due to their production but can be rounded. A compromise between the two said effects can be achieved by the choice of two Fresnel steps. In particular, the number of Fresnel steps is selected so that a compromise between high efficiency and lesser complexity, for example for easier producibility, as well as optimal overall height of the lens is achieved.

According to at least one embodiment of the light fixture, the central lens area and the Fresnel steps are arranged on an upper face of the lens, in particular the focus area thereof, facing away from the light-emitting diode. Thus, the lens can be a Fresnel lens configured as a convergent lens.

According to at least one embodiment of the light fixture, the lens, in particular the focus area thereof, has on an underside facing the light-emitting diode a cavity which is radially surrounded by an annular cavity step. A cross-section of the cavity is trapezoidal. The cavity step can delimit the cavity and, in particular, can surround it radially, preferably completely. The cavity step preferably has a greater lateral spacing than the Fresnel steps relative to the light-emitting diode. It is possible that the cavity step laterally surrounds the light-emitting diode at least partially and/or the light-emitting diode is received at least partially in the cavity. A cavity inner face of the cavity step facing the light-emitting diode can form the oblique sides of the trapezoidal cross-section. The shorter of the two parallel sides of the trapezoid is preferably part of the lens. In this case the cavity can be open on the longer of the two parallel sides of the trapezoid.

According to at least one embodiment of the light fixture, the cavity has a base surface. Furthermore, the cavity step has a cavity inner face facing the base surface and a cavity outer face facing away from the base surface. The base surface and the cavity inner face form a part of a light entry surface of the lens, in particular the focus area thereof. Furthermore, the cavity outer face has a flatter configuration than the cavity inner face with regard to the base surface. The light entering the lens through the cavity inner face can be totally reflected on the outer surface by this configuration of the cavity outer face. The cavity outer face and the cavity inner face can jointly enclose an acute angle.

According to at least one embodiment of the light fixture, the cavity and/or the cavity step is/are designed and arranged in such a way that a part of the light emitted by the light-emitting diode in operation of the light fixture impinges on the cavity step, in particular the cavity inner face thereof, and is at least partially deflected by means of total reflection on the cavity inner face and/or the cavity outer face of the cavity step. Thus, the cavity step has characteristics of a total internal reflection (TIR) lens. The totally reflected light is preferably deflected forwards, so that it leaves the lens surface outside the refractive part of the lens, in particular outside the refractive Fresnel steps. A light fixture having a high optical efficiency can be provided by the combination of the refractive Fresnel elements and the totally reflecting cavity step.

According to at least one embodiment of the light fixture, a light exit surface of the lens facing away from the light-emitting diode is roughened at least at some points, preferably completely. A blending of light of different colors in the lens can be improved by means of such roughening. This is advantageous, in particular, when the light-emitting diode comprises a light-emitting diode chip which emits blue and a conversion element which converts the blue light emitted by the light-emitting diode chip emitted into differently colored light, in particular yellow, green and/or red light. The different color components of the light emitted by the light-emitting diode are then preferably mixed in the lens. This mixing can be improved by means of a roughening on the light exit surface, wherein it is possible that the efficiency of the light fixture is reduced as a result.

Furthermore, a lens is specified. The lens is preferably suitable for a light fixture described here. In other words, all features disclosed for the light fixture are also disclosed for the lens, and vice versa.

The lens comprises an outer area, a central lens area and annular Fresnel steps radially surrounding the central lens area. For this purpose, the lens is configured to focus light penetrating into the lens and propagating through the lens with an initial emission angle of more than 80° in such a way that a final maximum emission angle of the light propagated through the lens is at least 50° and at most 80°. In particular, the lens is designed in the manner of a Fresnel lens. The emission angle of the light emitted by the light-emitting diode can be reduced in particular by means of the lens.

BRIEF DESCRIPTION OF THE DRAWINGS

Preferred further embodiments of the invention are explained in greater detail by the following description of the drawings.

DETAILED DESCRIPTION OF PREFERRED EXEMPLARY EMBODIMENTS

Figure 1A:
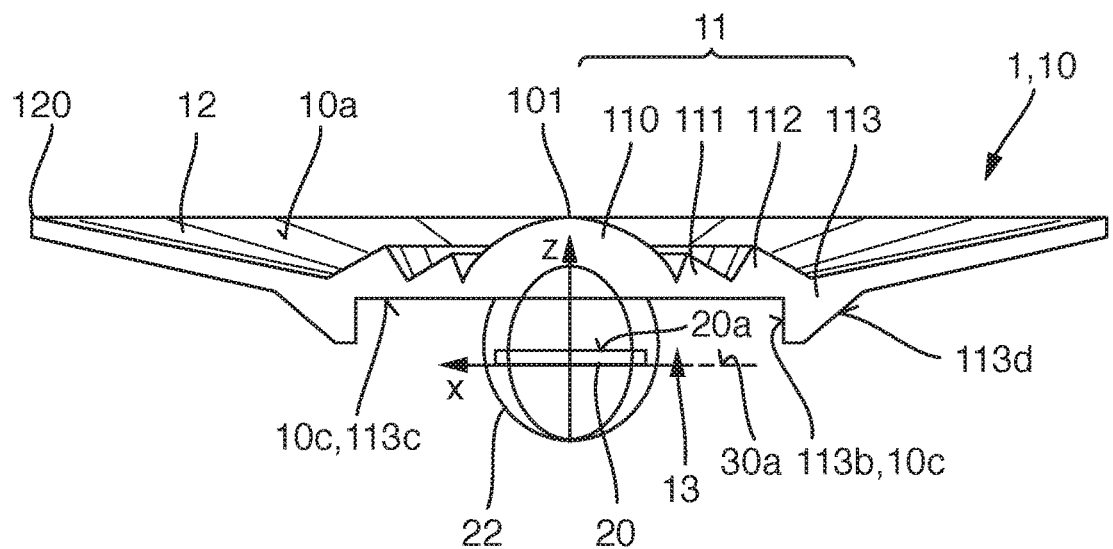
FIGS. 1A, 1B, 1C, 2A and 2B show exemplary embodiments of a light fixture described here as well as a lens described here.

The light fixtures described here, as well as the lens described here, are explained in greater detail below with reference to exemplary embodiments and the associated drawings. In this case elements which are the same, of the same kind, similar or equivalent are provided with the same reference numerals. Repeated description of some of these elements is omitted in order to avoid redundancies.

The drawings and the size ratios of the elements illustrated in the drawings elements should not be regarded as drawn to scale relative to one another. On the contrary, individual elements may be shown as excessively large for better illustration and/or to aid understanding.

An exemplary embodiment of a lens 10 described here as well as a light fixture 1 described here is explained in greater detail with reference to the schematic sectional view of FIG. 1A and the schematic plan views of FIGS. 1B and 10. The housing 30 of the light fixture 1 is not shown in FIGS. 1A to 1C.

The light fixture 1 comprises a lens 10 and a light-emitting diode 20 mounted on a mounting surface 30a. A radiating profile 22 of the light-emitting diode 20 is illustrated in FIG. 1A.

The lens 10 is arranged downstream of the light-emitting diode 20 in a vertical direction z which corresponds to the main emission direction of the light-emitting diode 20. A light-transmissive surface 20a of the light-emitting diode 20, through which the light-emitting diode 20 emits light during operation of the light fixture 1, extends in the lateral directions x, y.

The lens 10 is arranged with regard to the light-emitting diode 20 in such a way that a center point and/or the main emission direction of the light-emitting diode 20 coincides with the optical axis of the lens 10. The lens 10 comprises a light entry surface 10c facing the light-emitting diode 20 and a light exit surface 10a which is located on a side of the lens 10 remote from the light entry surface 10c. Furthermore, the lens 10 contains a focus area 11 and an outer area 12.

The outer area 12 is bent upwards, that is to say away from the light-emitting diode 20, in such a way that the outer area extends obliquely with respect to the light entry surface 20a or not perpendicularly with respect to the vertical direction z. Due to the bending upwards, on the one hand the dimensions of the lens 10 can be adapted to the requirements of the housing 30 (not shown in FIGS. 1A to 10) and on the other hand, an aesthetic impression of the lens 10 can be improved. In particular, a conventional halogen lamp can be simulated by means of the bending of the reflector.

In the focus area 11, the lens 10 is formed like a Fresnel lens on the upper face of the lens 10 facing away from the light-emitting diode 20. The lens 10 comprises in the focus area 11 a central lens area 110, a first Fresnel step 111 radially surrounding the central lens area 110 and a second Fresnel step 112 radially surrounding the first Fresnel step 111 and the central lens area 110. The emission angle α of the light emitted by the light-emitting diode 20 can be reduced by means of the central lens area 110, the first Fresnel step 111 and the second Fresnel step 112.

On an underside facing the light-emitting diode 20 the lens 10 has a cavity 13 in the focus area 11. The cavity 13 is delimited by a cavity 113 which radially surrounds the cavity step 13. The cavity step 113 also radially surrounds the central lens area 111, the first Fresnel step 111 and the second Fresnel step 112. A base surface 113c of the cavity 13 is formed by a part of the light entry surface 10c.

The cavity step 113 comprises a cavity inner face 113b facing the light-emitting diode 20 and a cavity outer face 113d facing away from the cavity inner face 113b. The cavity step 13 forms a total reflection lens for light emitted laterally by the light-emitting diode 20 in the direction of the cavity step 13. For this purpose, the cavity outer face 113d has a flatter configuration than the cavity inner face 113b with regard to the mounting surface 30a and/or the base surface 113c. The cavity inner face 113b is part of the light entry surface 10c of the lens 10. Light which penetrates through the cavity inner face 113b into the cavity step 113 can be totally reflected at least in part on the cavity outer face 113d.

The outer area 12 has an upper outer edge 120 which has the greatest vertical spacing of the outer area 12 relative to the light-emitting diode 20. Furthermore, the focus area 11 has an upper edge 101 of the lens 10 which has the greatest vertical spacing of the focus area 11 relative to the light-emitting diode 20. The outer edge 120 preferably has a vertical spacing which is greater than or the same as the upper edge 101 relative to the light-emitting diode 20. In other words, the focus area 11 does not project beyond the outer area 12.

Figure 1B:
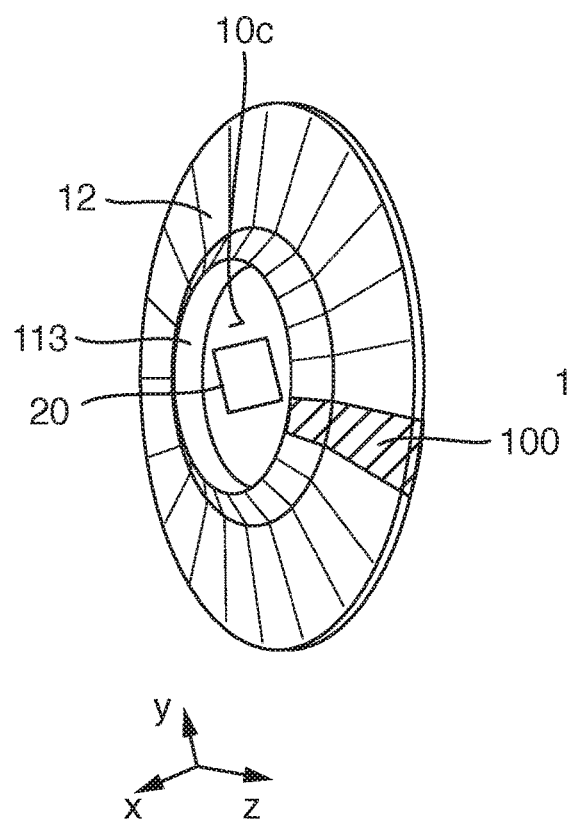
Figure 1C:
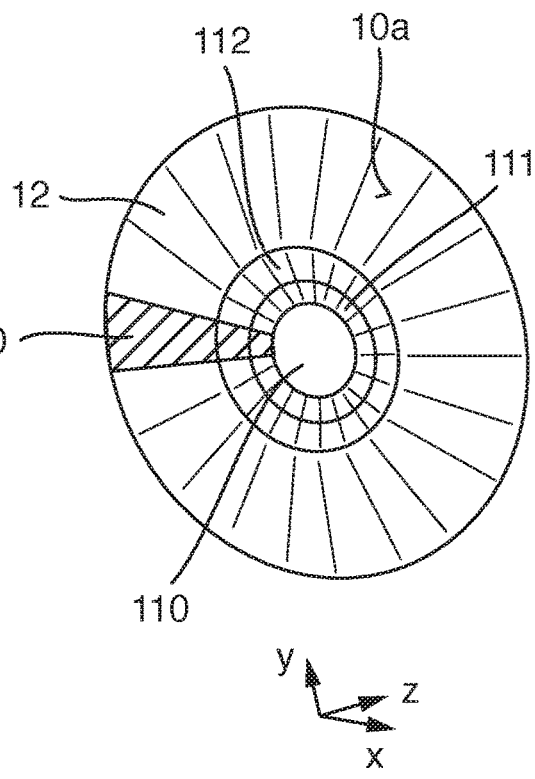

As shown by way of example in FIGS. 1B and 1C, the lens 10 can be made up of individual segments 100, wherein each segment 100 can have planar outer faces. Such segments 100 can improve the aesthetic impression of the lens 10 and the light mixing properties.

Figure 2A:
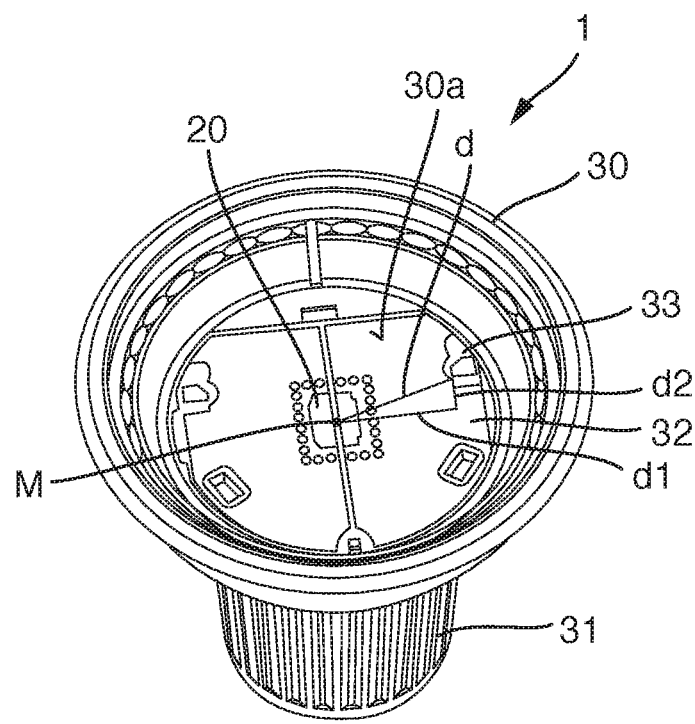

An exemplary embodiment of a light fixture 1 described here is explained in greater detail with reference to the schematic plan view of FIG. 2A and the schematically sketched side view of FIG. 2B. A housing 30 of a light fixture 1 is illustrated, wherein the light-emitting diode 20 is received in a depression of the housing 30. In the depression the light-emitting diode 20 is mounted on a printed circuit board 32, the surface of which forms the mounting surface 30a. The light-emitting diode 20 is preferably mounted on the mounting surface 30a in such a way that a center point M of the light-emitting diode 20 is centered with the housing 30.

The housing 30 is provided to be closed by a lens 10, in particular the lens 10 illustrated in FIGS. 1A, 1B and 1C. For this purpose, the lens 10 can be mounted on the depression. In particular, a diameter of the lens 10 in the lateral direction x, y corresponds to the diameter of the depression of the housing 30. The lens 10 is preferably attached in such a way that the optical axis of the lens 10 extends through the center point M of the light-emitting diode 20.

The housing 30 comprises a lamp base 31, in which an electronic driver for the light-emitting diode 20 can be received. The driver is located, in particular, on an underside of the printed circuit board 32 facing away from the light-emitting diode 20 and is electrically conductively connected to the light-emitting diode 20. For example, the housing 30 is a housing 30 of a conventional halogen lamp, in particular a so-called PAR 16 or MR 16 lamp.

A mounting component 33, which projects beyond the printed circuit board 32 or the mounting surface 30a in the vertical direction z, is located in the depression. The mounting component 33 is preferably a mounting bracket, by means of which the driver is fixed and/or electrically contacted on the housing 30, in particular the printed circuit board 32. The mounting component 33 projects as so-called "driver lugs" out of the printed circuit board 32.

The mounting component 33 has a lateral spacing d (also referred to as a radial spacing) relative to the center point M along the lateral directions x, y. This lateral spacing d can be divided into a first spacing d1 along the first lateral direction x and a second spacing d2 along the second lateral direction y. The lateral spacing d preferably corresponds to the total radius of the focus area 11.

The lateral spacing d can be at least 10 mm preferably be at least 12 mm and at most 13 mm. For example, the lateral spacing d is 12.41 mm, the first spacing d1 is 11.80 mm and the second spacing d2 is 3.85 mm.

Figure 2B:
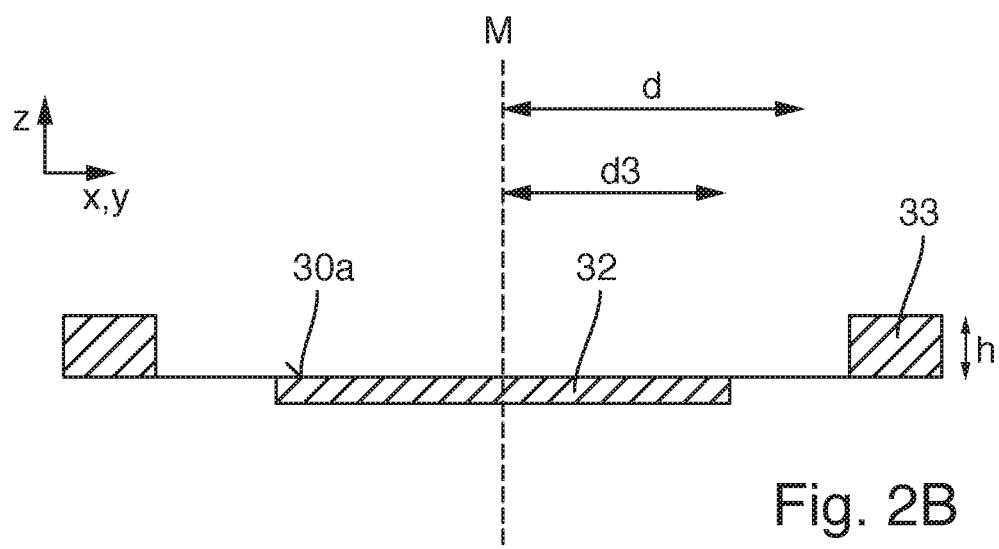

FIG. 2B shows schematically the lateral spacing d and the first spacing d1 of the mounting component 33 relative to the center point M of the light-emitting diode 20. The mounting component 33 has a height h in the vertical direction z. The mounting component 33 is spaced apart from the center point M by the lateral spacing d. The printed circuit board 32 is located inside a third spacing d3.

In particular, the height h of the mounting component 33 is at most 4 mm, preferably at least 1.0 mm and at most 3.5 mm, and particularly preferably 3 mm. For example, the third spacing d3 is 10 mm.

In order for the lens 10 to be adapted to the geometry of the housing 30, the lens 10 should be mounted in the region of the printed circuit board 32. That is to say, in particular, inside the first spacing d1 and/or the third spacing d3, as close as possible to the printed circuit board 32, in particular with a vertical spacing of less than 3 mm. This spacing is in order to optimally capture the light emitted by the light-emitting diode 20. However, in the region of the mounting component 33, that is to say in particular outside the lateral spacing d, the lens 10 should be at least 2 mm, preferably at least 3 mm, away from the mounting surface 30a, so that the lens 10 is not damaged by the mounting component 33.

This can be achieved by the lens 10 illustrated in FIGS. 1A to 1C. In the region of the mounting component 33, the lens 10 has the outer area 12 which, due to its configuration away from the mounting surface 30a, has a greater vertical spacing relative to the mounting surface 30a. While the focus area 11, which has a smaller vertical spacing relative to the mounting surface 30a than the outer area 12, is located in the region of the printed circuit board 32 or the light-emitting diode 20.

A light fixture 1 described here is explained in greater detail with reference to the intensity distributions in FIGS. 3A, 3B and 3C.

Figure 3A:
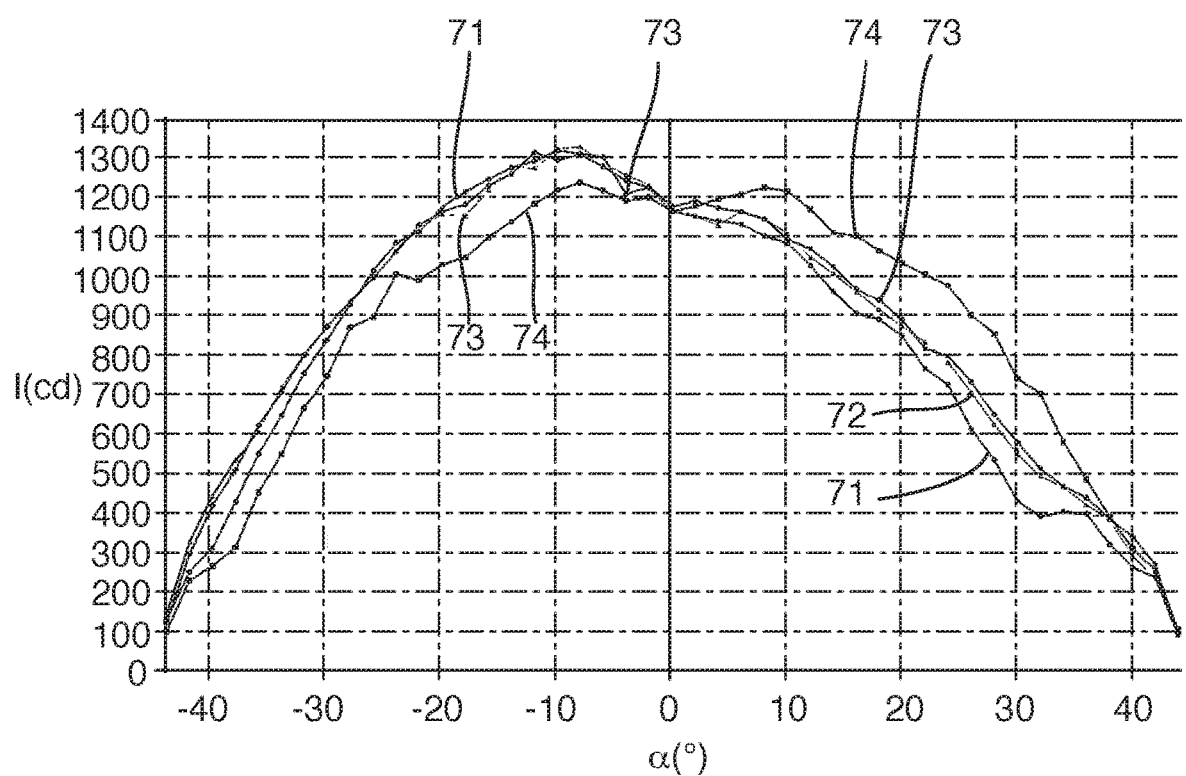
FIGS. 3A, 3B and 3C show intensity distributions for exemplary embodiments of a light fixture described here as well as a lens described here.

FIG. 3A shows a first intensity distribution 71, a second intensity distribution 72, a third intensity distribution 73 and a fourth intensity distribution 74 as a function of the beam angle α. The intensity I is shown in each case in the unit Candela (cd). The four intensity distributions 71, 72, 73, 74 are in each case measured along different lateral directions x, y. The measurement of the fourth intensity distribution 74 took place along the first lateral direction x, the measurement of the fourth intensity distribution 71 took place along the first lateral direction x, the measurement of the third intensity distribution 73 took place along a lateral direction rotated by 44° relative to the second lateral direction y, and the measurement of the fourth intensity distribution 74 took place along a lateral direction rotated by 44° relative to the first lateral direction x.

The four intensity distributions 71, 72, 73, 74 substantially have an emission angle of 60°. In other words, the maximum intensity of approximately 1380 cd, in particular 1381.3 cd, at a beam angle α of approximately −5° (−10° for the fourth intensity distribution 74) has fallen by a half within a beam angle α in the range from approximately −35° (−40° for the fourth intensity distribution 74) to approximately +25° (+20° for the fourth intensity distribution 74). For the exemplary embodiment the calculated optical efficiency is at least 90%, in particular 91.875%.

The calculations of FIG. 3A are also consistent with simulations for the light fixture 1. For the simulations, a light-emitting diode 20 with good color rendering and good emission properties were assumed. Different exemplary embodiments of the light fixture 1, according to the present invention, were compared with three alternative light fixtures 1'. In this case the first alternative light fixture 1' (cf. also FIG. 4A) and the third alternative light fixture 1' (cf. also FIG. 4B) have an emission angle in the required range, but their dimensions are not adapted to the housing 30 and/or they have a reduced optical efficiency. The second alternative light fixture 1' can be adapted to the housing 30 but does not produce an emission angle in the range from 50° to 80°. The result of these simulations is shown in the following Table 1. In this case the collimation strength (CS) indicates the quotient of the maximum intensity and the luminous flux within the 90° cone.

|  | First alternative light fixture | Second alternative light fixture | Third alternative light fixture | Light fixture according to the invention |
|---|---|---|---|---|
| Emission angle | 58° | 37° | 72° | 65° |
| Optical efficiency (based on 90° cone) | 81.4% | 87.2% | 90.8% | 91.9% |
| Overall efficiency | 93.1% | 95.1% | 94.6% | 96.0% |
| Ratio of emission in 90° cone to total flux | 87.4% | 91.7% | 96% | 96% |
| Collimation strength in the 90° cone | 1.19 cd/lm | 2.02 cd/lm | 0.92 cd/lm | 1.11 cd/lm |

Figure 3B:
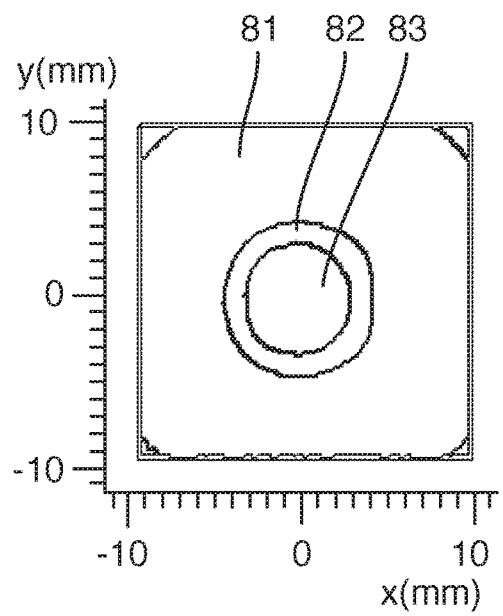
Figure 3C:
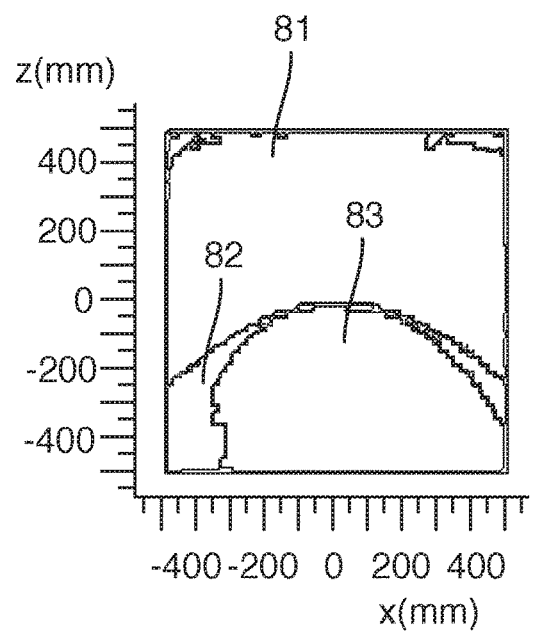

FIGS. 3B and 3C show simulations of a two-dimensional intensity distribution 81, 82, 83. FIG. 3B shows the simulation in a plane spanned by the lateral directions x, y, and FIG. 3C shows the simulations in a plane spanned by the first lateral direction x and the vertical direction z. The intensity distribution 81, 82, 83 of the light emitted by the light fixture 1 is shown in each case. In this case the intensity distribution 81, 82, 83 is in each case shown only roughly for a first intensity 81, a second intensity 82 and a third intensity 83, wherein the first intensity 81 is less than the second intensity 82, and the second intensity 82 is less than the third intensity 83.

The substantially Lambertian emission characteristic of the light-emitting diode 20 is focused by the lens 10, so that the light emitted by the light fixture 1 has an emission angle in the range from at least 50° to at most 80°, in particular 60°.

Alternative lenses 10' for an alternative light fixture 1', in particular the first alternative light fixture 1' and the third alternative light fixture 1' according to the above simulation are explained in greater detail with reference to the schematic sectional representations of FIGS. 4A and 4B.

Figure 4A:
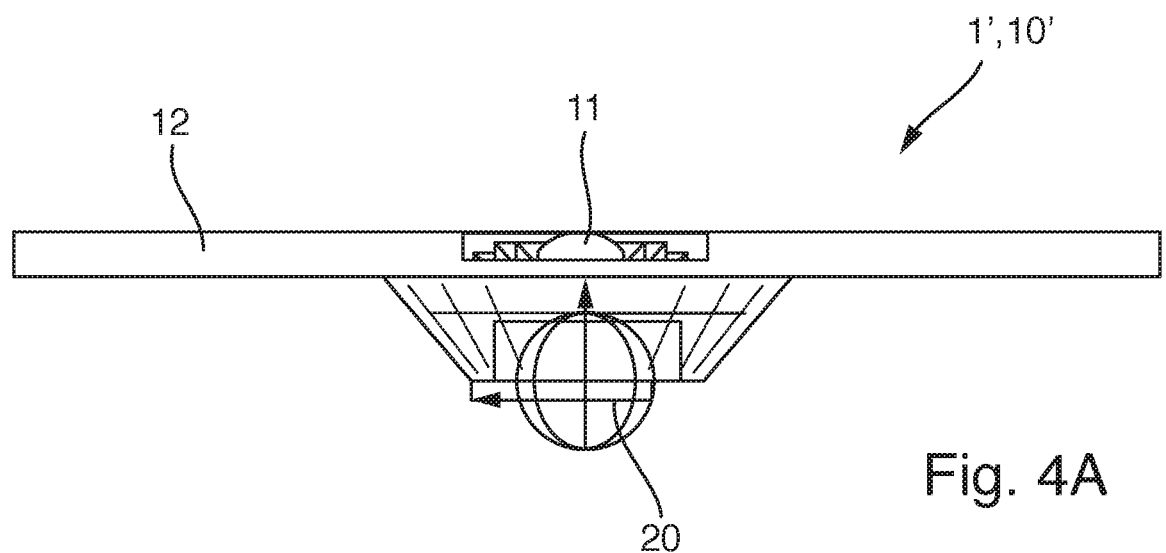
FIGS. 4A, 4B, 5A and 5B show alternative light fixtures with alternative lenses.

The alternative lens 10' of FIG. 4A is designed in the manner of a total reflection lens. In the focus area 11 of the alternative lens 10' this lens is designed in such a way that the light emitted by the light-emitting diode 20 is concentrated. However, such an alternative lens 10' has a low optical efficiency.

Figure 4B:
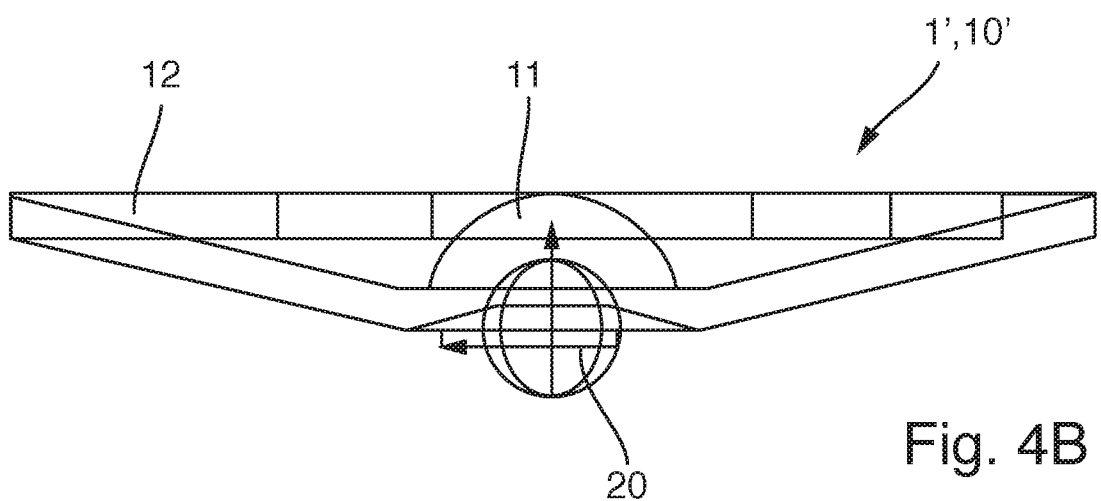

The alternative lens 10' of FIG. 4B has a spherical lens in the focus area 11. As a result, a high optical efficiency can be achieved, but such a lens 10' would collide with the mounting component 33 in the depression of the housing 30.

Figure 5A:
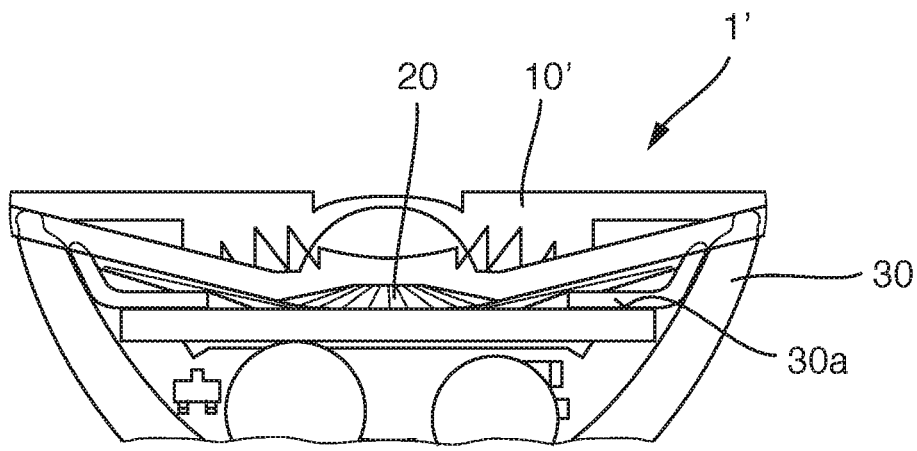
Figure 5B:
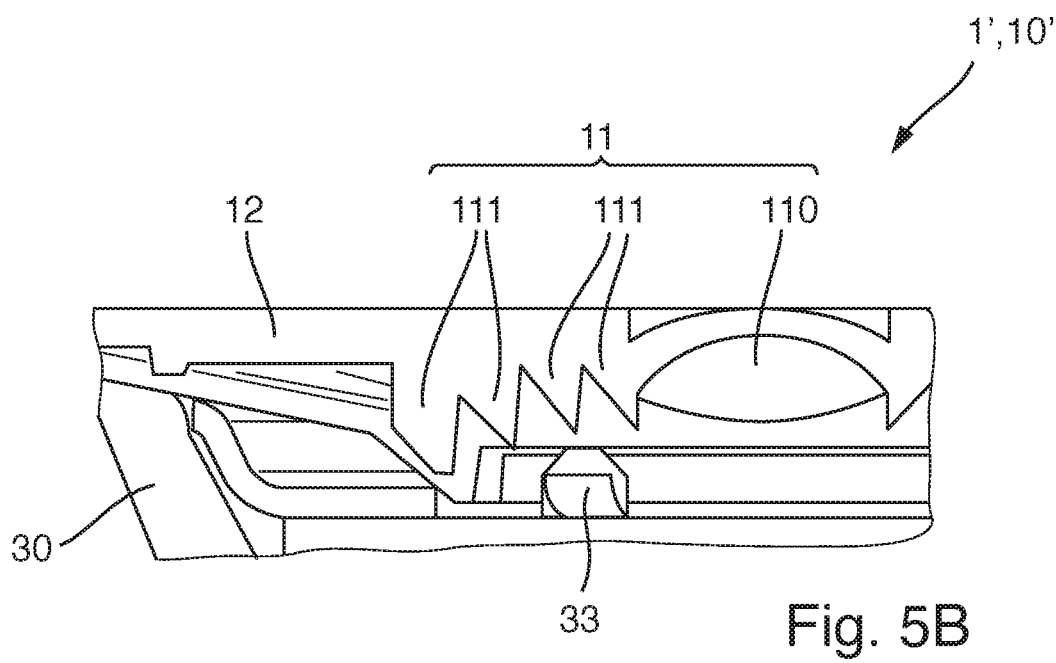

A further exemplary embodiment of an alternative light fixture 1' with an alternative lens 10' is explained in greater detail with reference to the schematic illustrations in FIGS. 5A and 5B. The housing 30 of the alternative light fixture 1' corresponds to the housing of the light fixture 1 according to the invention. In this case, FIG. 5B shows an enlargement of the alternative light fixture 1' in the region of the mounting component 33 of the housing 30. The alternative lens 10' of the alternative light fixture 1' can be designed similarly to the alternative lens 10' of FIG. 5B.

The alternative lens 10' of the alternative light fixture 1' has a central lens area 110 and four Fresnel steps 111, mounted on an underside of the alternative lens 10' facing the light-emitting diode 20. However, these Fresnel steps 111 collide with the mounting component 33. Although a high optical efficiency of the alternative light fixture 1' is facilitated by the alternative lens 10', an adaptation of the housing 30 would be necessary.

The invention is not limited to these embodiments by the description with reference to the exemplary embodiments. On the contrary, the invention encompasses each new feature as well as any combination of features, in particular including any combination of features in the claims, even if this feature or this combination itself is not explicitly given in the claims or the exemplary embodiments.

LIST OF REFERENCES 1 light fixture
1' alternative light fixture
10 lens
10' alternative lens
100 segment
101 upper edge
10c light entry surface
10a light exit surface
11 focus area
110 central lens area
111 (first) Fresnel step
112 second Fresnel step
113 cavity step
113b cavity inner face
113d cavity outer face
113c base surface
12 outer area
120 outer edge
13 cavity
20 light-emitting diode
20a light-transmissive surface
30 housing
30a mounting surface
31 lamp base
32 circuit board
30a mounting component
71, . . . , 74 first, . . . , fourth intensity distribution
81,82,83 first, second, third intensity
α beam angle
x first lateral direction
y second lateral direction
z vertical direction
d1,d2,d3 first, second, third spacing
d lateral spacing
h height

The invention claimed is:

1. A light fixture, comprising a housing having a depression in which at least one light-emitting diode is received, which is mounted on a mounting surface and which in operation of the light fixture emits light with an initial emission angle of more than 80°, and a lens arranged downstream of the light-emitting diode, having a central focus area and an outer area radially surrounding the focus area, wherein the central focus area is configured in such a way that a part of the light propagating through the focus area is focused in such a way that a final emission angle of the light propagated through the focus area is at least 50° and at most 80°, and the outer area of the lens is spaced at least 2 mm from the mounting surface in a vertical direction.

2. The light fixture according to claim 1, wherein at least one mounting component projecting in the vertical direction beyond the mounting surface is received in the depression of the housing, wherein a total radius of the focus area is at most as great as a lateral spacing between the light-emitting diode and the mounting component, and wherein a vertical spacing between the mounting surface and the outer area in the region of the mounting component is at least as great as a height of the mounting component in relation to the mounting surface.

3. The light fixture according to claim 1, wherein the lens closes the depression in the housing with a precise fit.

4. The light fixture according to claim 1, wherein the outer area encloses an angle of less than 90° with an optical axis of the lens.

5. The light fixture according to claim 4, wherein the focus area extends in the vertical direction at most as far as an outer plane defined by an upper outer edge of the outer area.

6. The light fixture according to claim 1, wherein the housing projects at least partially over the lens in the vertical direction and/or ends flush with an upper edge of the lens.

7. The light fixture according to claim 1, wherein the lens is designed in the manner of a Fresnel lens and/or the focus area has a central lens area and annular Fresnel steps radially surrounding the central lens area.

8. The light fixture according to claim 7, wherein the lens has precisely two annular Fresnel steps.

9. The light fixture according to claim 7, wherein the central lens area and the Fresnel steps are arranged on an upper face of the lens facing away from the light-emitting diode.

10. The light fixture according claim 1, wherein the lens has on an underside facing the light-emitting diode a cavity which is radially surrounded by an annular cavity step, wherein a cross-section of the cavity is trapezoidal.

11. The light fixture according to claim 10, wherein the cavity has a base surface and the cavity step has a cavity inner face facing the base surface and a cavity outer face facing away from the base surface, wherein the base surface and the cavity inner face form a part of a light entry surface of the lens and wherein the cavity outer face has a flatter configuration than the cavity inner face in relation to the base surface.

12. The light fixture according to claim 10, wherein at least one of the cavity and the cavity step is designed and arranged in such a way that a part of the light emitted by the light-emitting diode in operation of the light fixture impinges on the cavity step, and is at least partially deflected by means of total reflection on at least one of the cavity inner face and the cavity outer face of the cavity step.

13. The light fixture according to claim 10, wherein a light exit surface of the lens facing away from the light-emitting diode is roughened at least at some points.

14. A lens for a light fixture, comprising an outer area, a central lens area and annular Fresnel steps radially surrounding the central lens area, wherein the lens is configured to focus light penetrating into the lens and propagating through the lens with an initial emission angle of more than 80° in such a way that a final maximum emission angle of the light propagated through the lens is at least 50° and at most 80°.

* * * * *